US007019060B1

(12) United States Patent
Morrison et al.

(10) Patent No.: US 7,019,060 B1
(45) Date of Patent: Mar. 28, 2006

(54) LOW APPLICATION TEMPERATURE HOT MELT ADHESIVE

(75) Inventors: Brian D. Morrison, Lebanon, NJ (US); Ingrid Cole, Somerville, NJ (US); Justin A. Mehaffy, Flemington, NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 0 days.

(21) Appl. No.: 09/439,655

(22) Filed: Nov. 12, 1999

(51) Int. Cl.
*C08L 91/06* (2006.01)

(52) U.S. Cl. ............ 524/270; 524/272; 524/277; 524/487; 524/489; 524/508

(58) Field of Classification Search ............ 524/270, 524/272, 277, 487, 489, 508
See application file for complete search history.

(56) References Cited

U.S. PATENT DOCUMENTS

| | | | | |
|---|---|---|---|---|
| 3,390,035 A * | 6/1968 | Sands | .......................... | 156/72 |
| 3,429,843 A * | 2/1969 | Arnold et al. | .............. | 524/523 |
| 3,537,946 A * | 11/1970 | Truax et al. | .................. | 428/97 |
| 3,560,420 A * | 2/1971 | Tamura et al. | ............. | 524/271 |
| 3,615,106 A * | 10/1971 | Flanagan et al. | .......... | 281/21.1 |
| 3,798,118 A * | 3/1974 | Jones | ........................ | 428/484 |
| 3,843,574 A * | 10/1974 | Apikos | ....................... | 524/220 |
| 3,849,353 A * | 11/1974 | Taft et al. | ................... | 524/271 |
| 3,860,543 A * | 1/1975 | Masuda et al. | ............. | 524/297 |
| 3,896,069 A * | 7/1975 | Kosaka et al. | ................ | 524/68 |
| 3,944,695 A * | 3/1976 | Kosaka et al. | ............. | 428/200 |
| 4,066,810 A * | 1/1978 | Kosaka et al. | ............ | 428/195.1 |
| 4,081,415 A | 3/1978 | Matubara et al. | .... | 260/28.5 AV |
| 4,133,789 A * | 1/1979 | Lakshmanan | ............... | 156/322 |
| 4,167,433 A | 9/1979 | Lakshmanan | ............... | 156/322 |
| 4,358,557 A * | 11/1982 | Boggs | ....................... | 524/272 |
| 4,367,113 A * | 1/1983 | Karim et al. | ................ | 156/327 |
| 4,460,728 A * | 7/1984 | Schmidt et al. | ............. | 524/271 |
| 4,497,941 A * | 2/1985 | Aliani et al. | ................ | 526/331 |
| 4,634,729 A | 1/1987 | Pavlin et al. | ............... | 524/285 |
| 4,650,822 A | 3/1987 | Veazey et al. | .............. | 524/376 |
| 4,701,517 A | 10/1987 | Daughenbaugh | ............ | 528/205 |
| 4,752,634 A | 6/1988 | Goss | .......................... | 524/271 |
| 4,816,306 A | 3/1989 | Brady et al. | ............. | 428/36.92 |
| 4,874,804 A | 10/1989 | Brady et al. | ................ | 524/100 |
| 4,960,295 A * | 10/1990 | Bodouroglou | ............. | 281/15.1 |
| 4,965,305 A * | 10/1990 | Jones | ........................ | 524/349 |
| 5,041,482 A | 8/1991 | Ornsteen et al. | ............ | 524/272 |
| 5,176,779 A * | 1/1993 | Perrington et al. | ......... | 156/289 |
| 5,310,803 A | 5/1994 | Hansen | ....................... | 525/228 |
| 5,326,413 A * | 7/1994 | Esemplare et al. | ......... | 156/154 |
| 5,331,033 A | 7/1994 | Stauffer et al. | ............. | 524/275 |
| 5,373,049 A | 12/1994 | Ornstern et al. | ............ | 524/487 |
| 5,458,982 A | 10/1995 | Godfrey | ...................... | 428/514 |
| 5,500,472 A | 3/1996 | Liedermooy et al. | ....... | 524/272 |
| 5,574,084 A | 11/1996 | Peacock | ...................... | 524/270 |
| 5,928,782 A * | 7/1999 | Albrecht | ..................... | 428/355 |
| 5,939,483 A * | 8/1999 | Kueppers | .................... | 524/487 |
| 6,022,947 A * | 2/2000 | Frihart et al. | ............... | 530/212 |
| 6,034,159 A * | 3/2000 | Malcolm | ..................... | 524/293 |
| 6,117,945 A * | 9/2000 | Mehaffy et al. | ............. | 525/159 |

OTHER PUBLICATIONS

Patent Abstracts of Japan, Publication No. 10130610, Publication Date May 19, 1998, Title: Hot Melt Adhesive And Hot Melt Adhesive Composition.
Patent Abstracts of Japan, Publication No. 10156995, Publication Date Jun. 16, 1998, Title: Composite Packing Lid Material—Comprises Hot Melt Adhesive Applied To Rear Surface Of Lid Material, Where Hot Melt Adhesive Includes Ethylene Vinyl Acetate Copolymer.

* cited by examiner

*Primary Examiner*—Bernard Lipman
(74) *Attorney, Agent, or Firm*—Cynthia L. Foulke

(57) ABSTRACT

A low application temperature hot met adhesive composition and its use in carton, case or tray formation comprising from about 5 to about 60 weight percent ethylene vinyl acetate with about 30 to about 50 weight percent VA content and having a melt index of about 700 to about 4,000 dg/min; a tackifier; and wax with a melting point of about 125 to about 180° F.

14 Claims, No Drawings

LOW APPLICATION TEMPERATURE HOT MELT ADHESIVE

BACKGROUND OF THE INVENTION

Hot-melt adhesives, are materials which are applied to a substrate when molten and cooled to harden the adhesive layer, and are widely used for industrial applications.

Most commercially available hot-melt adhesives require temperatures of 350° F. or greater to ensure complete melting of all the components and also to achieve a satisfactory application viscosity. The need for such elevated temperatures is not without problems. The high temperatures increase the operators risks with respect both to burns and to inhalation of residual volatiles. In addition, the high temperatures require more energy, placing greater demands on the manufacturing facility.

Adhesive formulations which can be applied at temperatures below 300° F. may be prepared using low molecular weight components or by incorporating a high wax content. Although these formulations achieve low application viscosity, there is a resulting loss of adhesive properties. Therefore, to improve adhesion, softer or more amorphous components are added. However, these amorphous components reduce the effective heat resistance, particularly under cantilever stressed bonds subjected to high temperatures for an extended duration.

Accordingly it would be desirable to have an adhesive which has good bond strength with exceptional heat resistance and application viscosity, even if prepared with low molecular weight components for application at low temperatures.

SUMMARY OF THE INVENTION

We have now found hot-melt adhesives prepared from
a) about 5 to about 60 weight percent ethylene vinyl acetate having a vinyl acetate content of about 30 to about 50 weight percent and a melt index of about 700 to about 4,000 dg/min;
b) about 5 to about 60 weight percent of a tackifier; and
c) about 15 to about 55 weight percent wax with a melting point of about 125° F. to about 180° F.

The hot-melt adhesive compositions of the present invention can be applied at temperatures of 200° F. to 300° F. yet still provide exceptional heat resistance despite using low molecular weight components which would conventionally be thought to produce poor heat and cold resistance.

Accordingly, the hot-melt adhesives of the present invention find use in case and carton sealing operations. Corrugated cases are often subjected to high stresses and adverse environmental conditions during shipping. The hot-melt adhesives of the present invention meet the rigorous requirements for this and other applications.

DETAILED DESCRIPTION OF THE INVENTION

The present invention is directed to hot-melt adhesive compositions which can be applied at temperatures between 200° F. to 300° F. yet still provide exceptional heat resistance and good cold adhesion despite using low molecular weight components.

The ethylene vinyl acetate copolymers (EVA) useful herein are those containing about 30 weight percent to about 50 weight percent vinyl acetate and having a melt index of about 700 dg/min to about 4,000 dg/min. The preferred copolymers are available from EXXON under the designation ESCORENE MV01040 and comprise approximately 40 weight percent vinyl acetate and have a melt index of about 1,000 dg/min. The amount of the copolymer present in the hot-melt adhesive varies from about 5 to 60 weight percent by weight, preferably about 35 to about 45 weight percent by weight.

Tackifiers useful in the present invention include terpene, terpene phenolic, modified terpene, and combinations thereof. Terpene phenolic tackifiers also include the hydrogenated derivatives of phenolic modified terpene resins, for example, as the resin product resulting from the condensation, in an acidic medium, of a bicyclic terpene and a phenol. NIREZ 2040, a phenolic modified terpene having a Ring and Ball softening point about 125° C. and available from Arizona Chemicals, is the most preferred.

For use herein, it is also important that the tackifiers have a Ring and Ball softening point less than about 130° C., preferably about 125° C.

Tackifiers are utilized in amounts of about 5 weight percent to about 60 weight percent, by weight of the hot-melt adhesive composition. The present invention contemplates that the hot-melt adhesive composition of the present invention comprise one or more of the above tackifiers.

The compositions of this invention may optionally contain at least one additional tackifier selected from the group consisting of rosin, rosin derivatives, rosin ester, aliphatic hydrocarbons, aromatic hydrocarbons, aromatically modified aliphatic hydrocarbons and mixtures thereof. Examples of rosin ester tackifiers include both natural and modified rosins such as gum rosin, wood rosin, tall-oil rosin, distilled rosin, hydrogenated rosin, dimerized rosin, polymerized rosin, as well as the glycerol and pentaerythritol esters of natural and modified rosins, such as, for example, the glycerol ester of pale wood rosin, the glycerol ester of hydrogenated rosin, the glycerol ester of polymerized rosin, the pentaerythritol ester of hydrogenated rosin, the phenolic-modified pentaerythritol ester of rosin, and combinations thereof. Glycerol rosin ester is the most preferred rosin ester.

Representative additional tackifiers include NIREZ V-2040 and NIREZ 300 from Arizona Chemical Company, and DERTOPHENE T 105 from DRT. Other commercially available tackifiers include SYLVATAC 100, ZONATAC and ZONESTER from Arizona Chemical Company, PERMALYN from Hercules, UNITAC Union Camp and NOVARES from Georgia Pacific.

Waxes suitable for use in the present invention are paraffin waxes having melting points in the range of about 125 to 175° F., such as, for example, PACEMAKER from Citgo, and R-2540 from Moore and Munger; and low melting point synthetic waxes (i.e. Fischer-Tropsch waxes) having a melting point of less than about 180° F. The most preferred wax is paraffin wax with a melting point of about 150° F. The wax component is utilized at levels of about 15 weight percent to about 55 weight percent, by weight of the hot-melt adhesive.

The hot-melt adhesives of the present invention may also contain a stabilizer or antioxidant. Among the applicable stabilizers or antioxidants included herein are high molecular weight hindered phenols and multifunctional phenols such as sulfur and phosphorous-containing phenol. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxyl group. The presence of these sterically bulky substituted radicals in the vicinity of the hydroxyl group serves to retard its stretching frequency, and correspondingly, its reactivity; this hindrance thus providing the phenolic compound with its stabilizing properties. Representative hindered phenols include: 1,3,5-trimethyl-2,4,6-tris-(3,5-di-tert-butyl-4-hydroxybenzyl)-benzene; pentaerythrityl tetrakis-3(3,5-di-tert-butyl-4-hydroxyphenyl)-propionate; n-octadecyl-3(3,5-di-tert-butyl-4-hydroxyphenyl)-propionate; 4,4'-methylenebis (2,6-tert-butyl-phenol); 4,4'-thiobis(6-tert-butyl-o-cresol); 2,6-di-tertbutylphenol; 6-(4-hydroxyphenoxy)-2,4-bis(n-octyl-thio)-1,3,5 triazine; di-n-octylthio)ehtyl 3,5-di-tert-butyl-4-hydroxy-benzoate; and sorbitol hexa[3-(3,5-di-tert-butyl-4-hydroxy-phenyl)-propionate].

The performance of these antioxidants or stabilizers may further be enhanced by utilizing, in conjunction therewith, known synergists such as, for example, thiodipropionate esters and phosphites. Distearylthiodipropionate is particularly useful. These, if used, are generally present in amounts of about 0.1 to 1.5 weight percent, preferably 0.25 to 1.0 weight percent.

Depending on the contemplated end uses of the hot-melt adhesives, other additives such as plasticizers, pigments and dyestuffs conventionally added to hot-melt adhesives may be included. In addition, small amounts of additional tackifiers and/or waxes such as microcrystalline waxes, hydrogenated castor oil and vinyl acetate modified synthetic waxes may also be incorporated in minor amounts, i.e., up to about 10 weight percent by weight, into the formulations of the present invention.

A preferred embodiment of the present invention is directed to a hot-melt adhesive composition comprising:
  a) about 35 weight percent ethylene vinyl acetate with about 40 weight percent vinyl acetate and having a melt index of at about 1,000;
  b) about 30 weight percent of a tackifier selected from the group consisting of terpene, terpene phenolic, modified terpenes, and combinations thereof;
  c) about 5 weight percent of at least one additional tackifier selected from the group consisting of hydrogenated glycerol, pentaerythritol, and combinations thereof; and
  d) about 30 weight percent wax with a melting point of about 150° F.

The hot-melt adhesive compositions of the present invention are prepared by blending the components in the melt at a temperature of about 135° C. until a substantially homogeneous blend is obtained, approximately two hours. Various methods of blending are known in the art and any method that produces a homogeneous blend is satisfactory.

The resulting hot-melt adhesives are characterized by a viscosity less than about 5,000 cps at 250° F. They may be applied at temperatures of 200 to 300° F. to provide superior adhesive bonds even when exposed to a wide variety of temperature conditions. The hot-melt adhesives possess excellent heat stability as characterized by the 72 hour 275° F. thermal stability test, which shows no signs of char, skinning, gel formation or phase separation. In addition, a bond formed by two pieces of corrugated case substrate held together by a ½" by 2" compressed bead can maintain a cantilever stress load of 2 to 2.5 psi for 24 hours at temperatures at or above 115° F. The resulting hot-melt adhesive is also characterized by showing good adhesion properties down to about −30° F.

As such the hot-melt adhesives find particular use as case, carton and tray forming and as sealing adhesives, for example, in the packaging of frozen or refrigerated food products. The hot-melt adhesives of the present invention are particularly useful for use in the packaging, converting, bookbinding and nonwoven markets, especially for primary case and carton sealing and for use in the cigarette industry.

EXAMPLES

In the following examples, which are provided for illustrative purposes only, all parts are by weight and all temperatures in degrees Celsius unless otherwise noted.

In the examples, all hot-melt adhesive formulations were prepared in single blade mixer heated to 135° C. by blending the components until homogeneous.

The hot-melt adhesives were then subjected to various tests simulating the properties needed for successful commercial applications.

Melt viscosities of the hot-melt adhesives were determined on a Brookfield Model RVT Thermosel viscometer using a number 27 spindle.

Adhesion at various temperatures, as noted, was determined by applying a ½ inch wide bead of hot-melt adhesive widthwise to a 1 inch by 2 inch piece of substrate (comprising polyethylene-coated SBS) and immediately bringing a second piece of substrate into contact. The bond is aged at each temperature for 24 hours. The bonds were separated by hand and a determination made as to the type of failure and the presence or absence of fiber tear (FT) was noted. "Full" as used in the examples herein refers to 95 to 100% fiber tear. "Partial" refers to 25 to 95% fiber tear. "Slight" refers to 1 to 25% fiber tear; and "No" refers to 0 to 1% fiber tear.

Heat stress was measured by forming a composite construction of adhesive (2×½" compressed) between two pieces of corrugated of specific dimensions. The adhesive bead forming this composite is then placed under approximately 2 pounds of cantilever stress for 24 hours at elevated temperatures. The maximum temperature at which this construction remains in tact for at least 24 hours is then noted.

Clarity was determined by heating 100 g of the adhesive blends to 135° C. (275° F.) in a 4 oz glass jar. A thermometer was placed in the jar and its visibility assessed visually as follows. If the thermometer remained visible as it was moved from the front to the back of the jar the product was designated "Clear"; if it remained visible only until the thermometer was moved to the center of the jar it was designated "Moderately Hazy"; and if it was visible only at the front of the jar it was designated "Hazy".

These measures of clarity provide an indication of a hot melt's overall compatibility, i.e., the compatibility of the individual ingredients with each other. Products that are clear reflect an overall compatible product. Systems which are hazy at their application temperature exhibit a micro separation changing the refraction index of the molten adhesive.

The following materials were used to prepare a series of adhesives in accordance with the present invention: IRGANOX 1010 (available from Ciba Geigy); NIREZ 2040 (available from Arizona Chemical Co.); SYLVATAC 40N (available from Arizona Chemical Co.); UNITAC R100 (available from Union Camp); KRISTALEX 3100 (available from Hercules Co.).

|  | Example 1 | Example 2 | Example 3 | Example 4 | Example 5 |
|---|---|---|---|---|---|
| Irganox 1010 | 0.5 | 0.5 | 0.5 | 0.5 | 0.5 |
| 150° F. SP Wax | 30 | — | — | — | 10 |
| 40% VA/1000MI EVA | 35 | 60 | 70 | 90 | 50 |
| Nirez 2040 125° C. SP | 35 | 40 | 30 | 10 | 40 |
| Viscosity @ 275° F. | 1,400 | 26,950 | 29,250 | 34,200 | 9,675 |
| Adhesion @ | | | | | |
| R T | Full | NA | NA | NA | Slight |
| 40° F. | Partial | NA | NA | NA | Partial |
| −30° F. | Full | NA | NA | NA | Partial |
| Kanebo Set Time W/1 sec OT | | | | | |
| Partial | ~1.7 sec. | NA | NA | NA | ~2.5 sec. |
| Full FT | ~3.5 sec. | NA | NA | NA | ~4.5 sec. |
| Open Time w/10 sec ST | ~3.0 sec. | NA | NA | NA | ~6.0 sec. |
| Clarity | Clear | Clear | Clear | Clear | Clear |
| Open Time w/10 sec ST | ~3.0 sec. | — | — | — | — |

Example 1 is formulated according to the present invention and shows very good adhesion and viscosity properties.

Comparative Example 2 contains EVA and tackifier but not wax according to the present invention and has unacceptably high viscosity.

Comparative Examples 3 and 4 contain tackifier but neither wax nor EVA according to the present invention and again have unacceptably high viscosities.

Comparative Example 5 contains EVA and tackifier according to the present invention, but does not contain the claimed amount of wax and shows poor adhesion properties.

|  | Example 7 | Example 8 | Example 9 | Example 10 |
|---|---|---|---|---|
| Irganox 1010 | 0.5 | 0.5 | 0.5 | 0.5 |
| 150° F. SP Wax | 30 | 30 | 35 | 35 |
| 33% VA/400MI EVA | 35 | — | 30 | 27 |
| 40% VA/50MI EVA | — | 35 | — | — |
| 40% VA/1000MI EVA | — | — | — | — |
| Nirez 2040 125° C. SP | 35 | 35 | 35 | 38 |
| Viscosity @ 275° F. | 2,330 | 9,175 | 1,455 | 1,100 |
| Adhesion @ | | | | |
| R T | Partial | NA | Partial | Partial |
| 40° F. | None | NA | None | None |
| −30° F. | Full | NA | Partial | Partial |
| Clarity | Clear | Hazy | Moderately Hazy | Moderately Hazy |
| Open Time w/ 10 sec ST | NA | NA | NA | ~6.0 sec. |

Comparative Examples 7 to 9 contain EVA having melt indexes outside the scope of this invention. It can be seen from these examples that the melt index of the EVA component according to this invention is necessary to provide good viscosity, clarity and adhesion.

|  | Example 11 | Example 12 | Example 13 | Example 14 |
|---|---|---|---|---|
| Irganox 1010 | 0.5 | 0.5 | 0.5 | 0.5 |
| 150° F. SP Wax | 30 | 30 | 30 | 30 |
| 40% VA/1,000MI EVA | 35 | — | — | 35 |
| Nirez 2040 125° C. SP | 30 | 30 | 30 | — |
| 40° C. SP Sylvatac 40N Rosin Ester | 5 | 5 | 5 | 5 |
| 28% VA/900MI EVA | — | — | — | — |
| 28% VA/2,500MI EVA | — | 35 | — | — |
| 33% BA/900MI EnBA | — | — | 35 | — |
| 100° C. SP Unitac R100 Rosin Ester | — | — | — | 30 |
| 100° C. SP Kristalex 3100 Alpha-methyl styrene | — | — | — | — |
| Viscosity @ 275° F. | 1,115 | 555 | 1,055 | 710 |
| Adhesion @ | | | | |
| R T | Full | Partial | Full | Partial |
| 40° F. | Partial | Partial | None | None |
| −30° F. | Partial | None | None | None |
| KANEBO Set Time W/1 sec OT | | | | |
| Partial | 1.75 | 1.7 | 1.2 | 2.7 |
| Full | 3.5 | 4.2 | 3.0 | 6.2 |
| Open Time w/10 sec ST | 3.0 | 2.0 | 3.0 | 1.5 |
| Heat Stress Pass Temp. | 115° F. | 105° F. | 110° F. | 105° F. |

Example 11 represents a preferred formulation according to this invention and has good viscosity, adhesion and heat stress properties.

Comparative Example 12 contains EVA copolymer having a VA content less than that stipulated in this invention and Comparative Example 13 is formulated using EnBA copolymer, these formulations show poor heat resistance and adhesion.

Comparative Examples 14 and 15 do not contain the required tackifier and as a result they show poor adhesion, slow set speed and/or low heat resistance.

|  | Example 15 | Example 16 |
|---|---|---|
| Irganox 1010 | 0.5 | 0.5 |
| 150° F. SP Wax | 30 | 30 |
| 40% VA/1,000MI EVA | 35 | — |
| Nirez 2040 125° C. SP | — | 30 |
| 40° C. SP Sylvatac 40N Rosin Ester | 5 | 5 |
| 28% VA/900MI EVA | — | 35 |
| 28% VA/2,500MI EVA | — | — |
| 33% BA/900MI EnBA | — | — |
| 100° C. SP Unitac R100 Rosin Ester | — | — |
| 100° C. SP Kristalex 3100 Alpha-methyl styrene | 30 | — |
| Viscosity @ 275° F. | 735 | 1,190 |
| Adhesion @ R T | None | Full |
| 40° F. | None | Partial |
| −30° F. | None | None |
| KANEBO Set Time W/1 sec OT | | |
| Partial | 2.5 | 1.5 |
| Full | 6.0 | 2.5 |
| Open Time w/10 sec ST | 1.5 | 3.0 |
| Heat Stress Pass Temp. | 120° F. | 105° F. |

Comparative Example 16 contains EVA copolymer whose vinyl acetate content falls outside the claims of the present invention. This formulations show poor heat resistance and adhesion.

We claim:
1. A hot melt adhesive composition comprising, by weight of the hot melt adhesive composition,
   a) about 35 weight percent to about 60 weight percent of an ethylene-vinyl acetate copolymer having a vinyl acetate content of about 30 weight percent to 50 weight percent and a melt index of about 700 to 4,000 dg/min;
   b) about 30 weight percent to about 60 weight percent of a tackifier selected from the group consisting of terpene, terpene phenolic, modified terpene, and combinations thereof; and
   c) about 15 weight percent to about 55 weight percent of a wax with a melting point of about 125° F. to 180° F.;
   wherein the hot melt composition can be applied to a piece of substrate at a temperature of 200° F. to 300° F. for bonding said substrate to a second piece of substrate.

2. An adhesive according to claim 1 wherein the ethylene-vinyl acetate copolymer comprises about 35 weight percent to about 45 weight percent vinyl acetate.

3. An adhesive according to claim 1 wherein the ethylene-vinyl acetate copolymer comprises about 40 weight percent vinyl acetate.

4. An adhesive according to claim 1 wherein the wax is paraffin wax or synthetic wax.

5. An adhesive according to claim 1 additionally comprising up to about 5 weight percent of at least one additional tackifier selected from the group consisting of rosin, rosin derivatives, rosin ester, aliphatic hydrocarbons, aromatic hydrocarbons, aromatically modified aliphatic hydrocarbons and mixtures thereof.

6. A hot melt adhesive composition comprising, by weight of the hot melt adhesive composition,
   a) about 35 weight percent of an ethylene-vinyl acetate copolymer with about 40 weight percent vinyl acetate and having a melt index of about 1,000 dg/min;
   b) about 30 weight percent of a tackifier selected from the group consisting of terpene, terpene phenolic, modified terpenes, and combinations thereof;
   c) about 5 weight percent of at least one additional tackifier selected from the group consisting of pentaerythritol, hydrogenated glycerol, and combinations thereof;
   d) about 30 weight percent of a wax with a melting point of about 150° F.;
   wherein the hot melt composition can be applied to a piece of substrate at a temperature of 200° F. to 300° F. for bonding said piece of substrate to a second piece of substrate.

7. A carton, case or tray formed utilizing the adhesive composition of claim 1, 5 or 6.

8. An adhesive according to claim 1 which comprises about 30 weight percent to about 60 weight percent of a terpene phenolic tackifier.

9. An adhesive according to claim 1 which comprises about 35 weight percent to about 45 weight percent of an ethylene-vinyl acetate copolymer.

10. An adhesive according to claim 6 which comprises about 30 weight percent a terpene phenolic tackifier.

11. A hot melt adhesive composition consisting essentially of, by weight of the hot melt adhesive composition,
    a) about 5 35 weight percent to about 60 weight percent of an ethylene-vinyl acetate copolymer having a vinyl acetate content of about 30 weight percent to 50 weight percent and a melt index of about 700 to 4,000 dg/min;
    b) about 30 weight percent to about 60 weight percent of a tackifier selected from the group consisting of terpene, terpene phenolic, modified terpene, and combinations thereof;
    c) up to about 5 weight percent of at least one additional tackifier selected from the group consisting of rosin, rosin derivatives, rosin ester, aliphatic hydrocarbons, aromatic hydrocarbons, aromatically modified aliphatic hydrocarbons and mixtures thereof;
    c) about 15 weight percent to about 55 weight percent of a wax with a melting point of about 125° F. to 180° F.; and
    d) an optional stabilizer;
    wherein the hot melt composition can be applied to a piece of substrate at a temperature of 200° F. to 300° F. for bonding said substrate to a second piece of substrate.

12. An adhesive according to claim 11 wherein said tackifier b) is a terpene phenolic tackifier.

13. An adhesive according to claim 11 wherein said ethylene-vinyl acetate is present in amounts of about 35 weight percent to about 45 weight percent.

14. A carton, case or tray formed utilizing the adhesive composition of claim 11.

* * * * *